US008702157B2

(12) United States Patent
Hirose et al.

(10) Patent No.: US 8,702,157 B2
(45) Date of Patent: Apr. 22, 2014

(54) VEHICLE FRONT STRUCTURE

(71) Applicant: Honda Motor Co., Ltd., Tokyo (JP)

(72) Inventors: Yoshitaka Hirose, Wako (JP); Hideyuki Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/627,033

(22) Filed: Sep. 26, 2012

(65) Prior Publication Data

US 2013/0076074 A1 Mar. 28, 2013

(30) Foreign Application Priority Data

Sep. 28, 2011 (JP) ................................ 2011-211931

(51) Int. Cl.
*B60R 19/52* (2006.01)
*B60R 19/48* (2006.01)

(52) U.S. Cl.
USPC .................. 296/193.1; 296/193.11; 180/68.6

(58) Field of Classification Search
USPC .......................... 296/193.1, 193.11; 180/68.6
See application file for complete search history.

(56) References Cited

U.S. PATENT DOCUMENTS

| 5,487,575 A | 1/1996 | Chase |
| 7,455,351 B2 * | 11/2008 | Nakayama et al. ........ 296/193.1 |
| 2002/0096378 A1 | 7/2002 | Kobayashi |
| 2008/0157566 A1 * | 7/2008 | Tazaki et al. ............... 296/193.1 |

FOREIGN PATENT DOCUMENTS

| JP | 05-338509 | 12/1993 |
| JP | 09-039835 | 2/1997 |
| WO | 03/024747 A1 | 3/2003 |

OTHER PUBLICATIONS

European Search Report for EP Application 12186061.3 dated Dec. 4, 2012, 5 pages.
Japanese Office Action dated Aug. 6, 2013, 3 pages.

* cited by examiner

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle front structure includes a front grille, and a hood edge, disposed above the front grille, configured to receive a front end edge of an engine hood of a vehicle, having a front end edge extending part extending downward from a front end edge thereof. The front grille includes, at an upper end, a grille supporting part, extending between an extending line (plane) of the hood edge and the front end edge extending part. The front end edge extending part is pinched between the grille supporting part and a supporting member provided behind the front grille.

13 Claims, 7 Drawing Sheets

VEHICLE FRONT STRUCTURE

CROSS REFERENCE TO RELATED APPLICATIONS

The present application is based on Japanese application JP 2011-211931 filed on Sep. 28, 2011, the content of which is hereby incorporated by reference into this application.

BACKGROUND OF THE INVENTION

1. Field of the Invention

The present invention relates to a vehicle front structure including a hood edge.

2. Description of the Related Art

Conventionally, a hood edge installed at a vehicle front for receiving a front end edge of an engine hood for opening and closing an engine room is known. The hood edge is a resin plate molded by a metal mold. For example, JP 9-39835 A discloses an engine hood molded to have a gentle curve inclining to a vehicle front direction (hereinafter simply referred to as "gentle curve").

In addition, on a back face side of the hood edge molded in such the gentle curve, there are formed a rear end edge extending part, extending downward from a rear end edge of the hood edge, fixed to a mounting beam and a front end edge extending part extending rearward from the front end edge on which a front grille is mounted (corresponding to "step 12" in JP 9-39835 A). The reason why the rear end edge extending part of the hood edge is formed to extend downward is that there is a possibility in that the rear end edge extending part may touch the engine hood if it is assumed that the rear end edge extending part is on a path of opening and closing operation of the engine hood disposed behind the rear end edge extending part.

The rear end edge extending part and the front end extending part are inclined such that tips thereof approach to each other. Accordingly, when the hood edge is produced with the metal mold, demolding is performed by sliding a piece of the mold. More specifically, the mold can be removed by sliding the piece of the mold because the hood edge having a gentle curve can bend to such an extent that the rear end edge extending part climbs over protruding parts in the mold by sliding the piece of the mold rearward.

However, there may be a case where the hood edge is formed in an upward protruding shape, which may be made in a case where the shape of the hood edge is a steep slope (hereinafter simply referred to as "steep slope"), a case where a length in front-rear direction is short, etc. When such the hood edge having the upward protruding shape is produced, though the piece of the mold is slid rearward, it is difficult to cause the rear end edge extending part climbs over protruding parts in the mold.

Accordingly, when the hood edge having the upward protruding shape is produced by the metal molds, there is a restriction in resin molding such that demolding is performed by sliding the mold downward along the rear end edge extending part. In other words, according to the prior art, in the case where the hood edge having the upward protruding shape is molded, the front end edge extending part extending rearward cannot be molded because of the restriction in molding with the metal mold. Accordingly, there is a problem in that the shape of the front end edge extending part is restricted to such a shape that the hood edge can be demolded by sliding the mold downward.

On the other hand, as a replacement of the front end edge extending part extending rearward, it may be supposed that the front end edge part is formed on a front side of the hood edge. Also this front end edge part has a shape which can be demolded by sliding the mold downward.

However, it may be required that the engine hood and the front grille forming a vehicle front are flush with each other in relation of adjoining components from designing and aerodynamic viewpoints. Accordingly, when the front end edge extending part is formed in front of the hood edge, this does not meet the design and the aerodynamic requirements requiring that the hood edge and the front grille are flush with each other. Therefore, the front end edge extending part cannot be formed in front of the hood edge due to the design and the aerodynamic restrictions.

The present invention has been developed in consideration of the backgrounds described above and aims to provide a hood edge including the front end edge extending part that can be formed by sliding a piece of the metal mold downward when demolding and a vehicle front structure meeting the design and aerodynamic requirements that the hood edge and the front grille are flush with each other.

SUMMARY OF THE INVENTION

A first aspect of the present invention provides a vehicle front structure comprising:

a front grille; and a hood edge, disposed above the front grille, configured to receive a front end edge of an engine hood of a vehicle, having a front end edge extending part extending downward from a front end edge thereof, wherein the front grille includes, at an upper end thereof, a grille supporting part, extending between an extending line of the hood edge and the front end edge extending part, and wherein the front end edge extending part is pinched between the grille supporting part and a supporting member provided behind the front grille.

According to the vehicle front structure, the front end edge, extending part extending downward from the front end edge, has a shape allowing molding by sliding the metal molding downward when the hood edge is manufactured with the metal molding. Accordingly, the hood edge integral with the front end edge extending part can be manufactured by metal molding.

On the other hand, regarding mounting the front grille, the front end edge extending part of the hood edge is pinched between the grille supporting member of the front grille and the supporting member mounted behind the front grille to have a pinching structure which makes it easily to mount the front grille under the hood edge.

The front end edge extending part extends downward from the front end edge of the hood edge, so that there is a space between the front end edge extending part and a front-direction extending line of a plane of the hood edge. However, the grille supporting part formed at an upper end of the front grille extends into the space.

Because the grille supporting part fills the space described above, the hood edge becomes flush with the front grille. This meets the design and aerodynamic requirements.

In addition, according to the hood edge having the front end edge extending part and the pinching structure, a face of the hood edge disposed at the vehicle front is not restricted to a gentle curved face, but a steep face can be adopted as the face of the hood edge. This provides a higher degree of freedom in designing the vehicle front including the hood edge.

According to the pinching structure, as the member for pinching the front end edge extending part, the supporting member disposed behind the front grille is used, so that a special member for pinching the front end edge extending member becomes unnecessary, which decreases the number of parts.

A second aspect of the present invention provides a vehicle front structure according to the first aspect, the hood edge may protrude upward to have an upward convex shape.

As described above, though the hood edge has an upward-convex shape, the hood edge can be integrally formed with the front end edge extending part by metal-mold molding as well as the front grille can be mounted under the hood edge.

A third aspect of the present invention provides a vehicle front structure according to the first aspect, wherein the front end edge extending part further includes a claw, at a lower end thereof, extending forward, wherein the grille supporting part includes a fitting part having, in cross-section thereof, substantially a U-shape which allows the claw to be fitted thereto, the supporting member including an abutting part, extending in a vertical direction, configured to pressurize the front end extending part, and wherein the front end edge extending part is pinched to be held between the grille supporting part into which the claw is fitted and the abutting surface of the supporting member.

According to this configuration, the front end edge extending part includes a claw, and the grille supporting part includes a fitting part having, in cross-section thereof, substantially a U-shape, being able to be fit to the claw, the supporting member extending in a vertical direction, an abutting part for pressurizing the front end extending part. Therefore, the front end edge extending part is pinched to be held between the grille supporting part into which the claw is fitted and engaged with the fitting part, which eliminates a possibility that the front grille pinching the front end edge extending part shifts in an up-down direction.

Moreover, because the front end edge extending part, extending in a vertical direction of the supporting member, is pinched by the abutting part pressurizing the front end edge extending part to provide a more strong pinching structure.

A fourth aspect of the present invention provides a vehicle front structure according to the first aspect, further comprises:

a front bumper disposed under the front grille;

a connecting part, extending along the front grille downward from both ends in a width direction of the hood edge, being continuous to the front bumper, wherein the hood edge, the connecting part and the front bumper are integrally formed.

According to the configuration described above, because the hood edge and the front bumper are connected with the connecting part extending from both ends of the hood edge, the hood edge and the front bumper are integrally molded by resin molding.

Accordingly, this may more contribute to enhancement in stiffness and decrease in the number of components than a case where the hood edge and the front bumper are resin-molded part by part.

In addition, according to the configuration described above, there is no possibility that the front grille mounted on the hood edge may shift up-down and left-right directions by vibrations because the front grille to be mounted on the hood edge is surrounded by the hood edge, the front bumper, and the connecting parts molded integrally.

A fifth aspect of the present invention provides a vehicle front structure according to the first aspect, wherein the front grille has a plurality of ambient air intake openings for sucking ambient air into inside of the vehicle, wherein the supporting member comprises a separating member for separating up and low a flow passage of the ambient air sucked into the inside of the vehicle into.

According to the configuration described above, fresh ambient air not heated can be supplied to the engine because the separating member separates the flow passage of the ambient air taken inside to the vehicle up and down, so that the ambient air is separated between ambient air for cooling a radiator and ambient air for intake of the engine.

As described above, the present invention can provide the vehicle front structure, being a hood edge including the front end edge extending part that can be molded by sliding a piece of the metal mold downward when demolding, meeting the design and aerodynamic requirements that the hood edge and the front grille adjoining to the hood edge are flush with each other.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Next, with reference to drawings will be described an embodiment of the vehicle front structure according the present invention. In the description of the vehicle front structure according to the embodiment of the present invention, the technically the same elements are designated with the same references.

Figure 1:
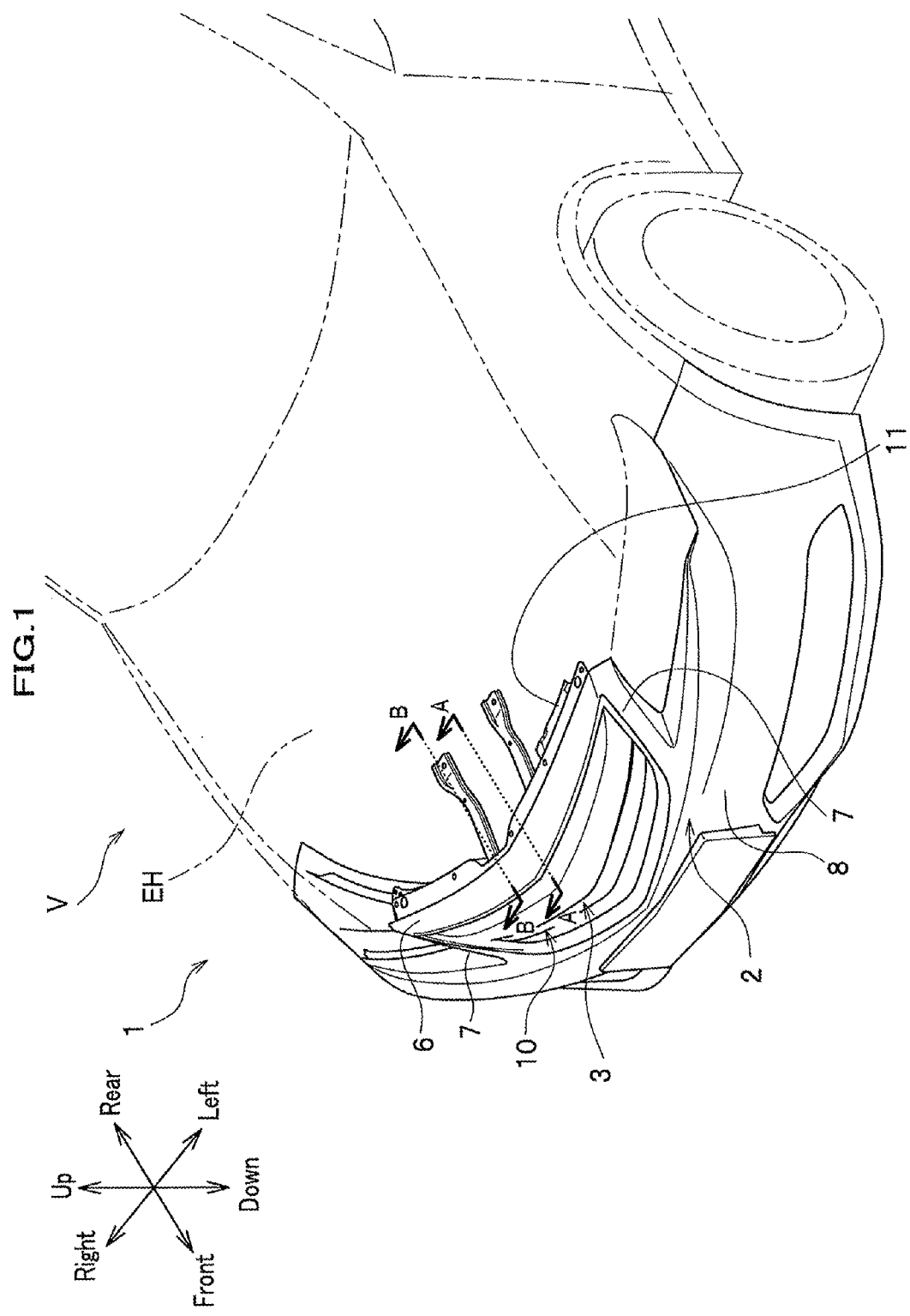
FIG. 1 is a perspective view showing an outline of the vehicle front structure according to the embodiment and more specifically a perspective view of the vehicle front viewed from a left upper side.

FIG. 1 is a perspective view of the front of the vehicle V when viewed from a left upper side. As shown in FIG. 1, the vehicle V according to the embodiment includes a front resin member 2 having an opening 10 formed at a central thereof, a front grille 3, mounted on the opening 10, the front grille 3 and a grille base 4, and a back plate 5 (see FIG. 5) mounted behind the grille base 4.

Hereinafter, a front part of the vehicle V is simply referred to as "a vehicle front part 1", a structure relating to the vehicle front part 1 is simply referred to as "vehicle front structure". In addition, in the embodiment, descriptions will be made such that a front-rear direction of the vehicle V is simply referred to as "front-rear direction". Moreover, descriptions will be made such that a vehicle width direction of the vehicle V when viewed by the driver is simply referred to as a right-left direction and a height direction of the vehicle V is simply referred to as a up-down direction.

Figure 2:
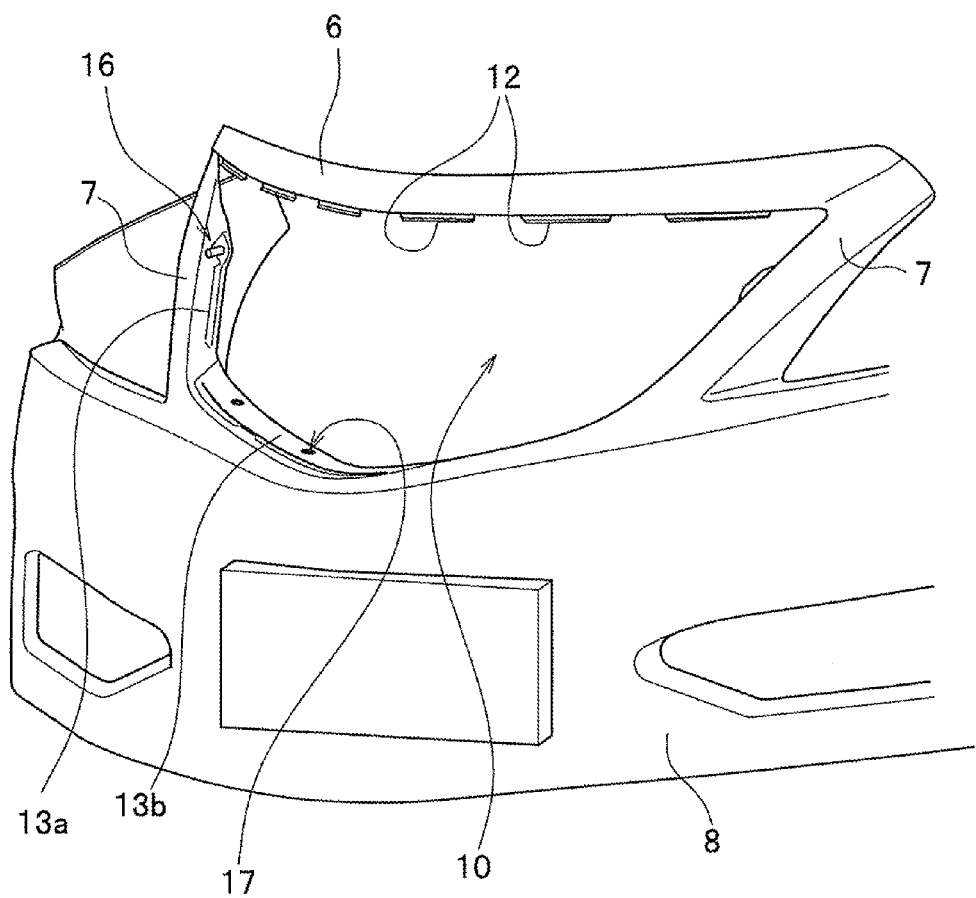
FIG. 2 is a partially enlarged view of a part of a front resin member according to the embodiment from a front upper side.

FIG. 2 is a partial enlarged view of the front resin member 2 according to the embodiment when viewed from a front upper side. The front resin member 2 is a member produced by molding a resin with a metal mold. As shown in FIG. 2, the front resin member 2 includes a hood edge 6, extending in left and right directions, having a short length in front-rear direction, a connecting part 7 extending downwardly from both left and right ends of the hood edge 6, and the front bumper 8 of which both ends extending to a rear side, which are integrally formed.

As shown in FIG. 2, the front resin member 2 has the opening 10 open in the front-rear direction at a center part thereof surrounded by the hood edge 6, the connecting part 7, and the front bumper 8 in which the hood edge 6, the connecting part 7, and the front bumper 8 are integrally formed.

In the present invention, there is no limit in kind of a resin material for forming the front resin member 2.

The hood edge 6 is, as shown in FIG. 1, a part, disposed in front of the engine hood EH, for receiving a front end edge of the engine hood EH. The front bumper 8 is a part, disposed on a lower side of the vehicle front part 1, for absorbing a load due to contact from the front thereof. In addition, the connecting part 7 is, as shown in FIG. 1, a part for connection connected to the hood edge 6 and the front bumper 8 in the up-down direction (vertical) to form the hood edge 6 and the front bumper 8 integrally.

Moreover, the hood edge 6, the connecting part 7, and the front bumper 8 integrally form a front of the vehicle V in addition to their respective functions. More specifically, the hood edge 6, the connecting part 7, and the front bumper 8 according to the embodiment are formed in a cross section view from the designing and aerodynamic viewpoints below.

Figure 3:
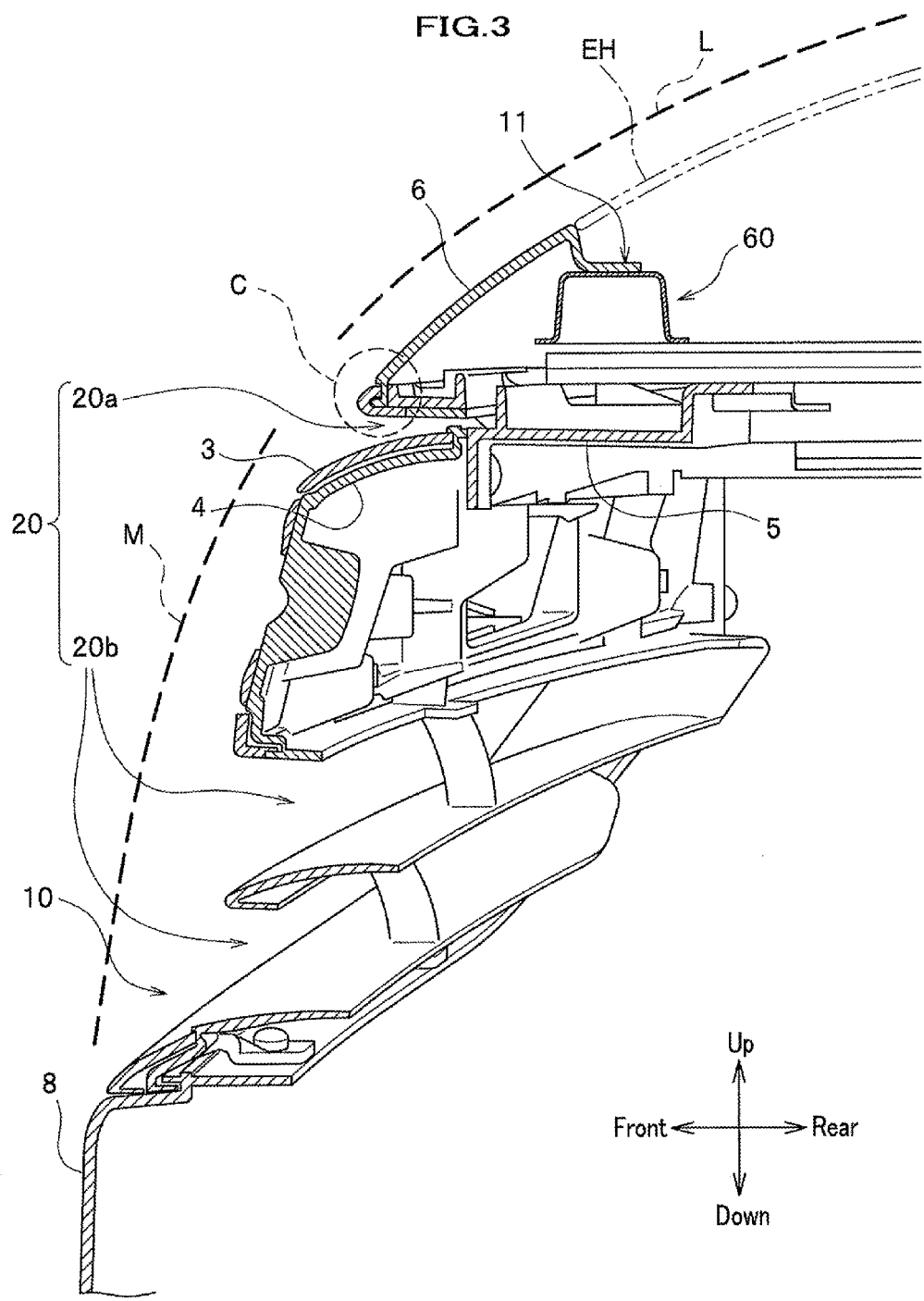
FIG. 3 is a cross section view of the vehicle front end structure taken line A-A shown in FIG. 1, when viewed from a vehicle width direction.

FIG. 3 is a cross section view of the vehicle front part 1 shown in FIG. 1 cut out along line A-A.

The hood edge 6 is, as shown in FIG. 3, formed to extend in a front direction along the extension line L of a curve on the engine hood EH disposed behind the hood edge 6. The connecting part 7 (not shown in FIG. 3) includes a face, formed to gently curve to be disposed further downward than an extended line L which the hood edge 6 defines and extending along a gentle curve M (see FIG. 3). The front bumper 8 includes a vertical face which is curved further downward than the curve M which the connecting part 7 forms.

In addition, the front resin member 2 according to the embodiment includes, as shown in FIGS. 1 and 2, the hood edge 6 includes a rear end extending part 11 extending from a rear end edge thereof, and a front end edge extending part 12, formed at a front end thereof, having a claw 15. The connecting part 7 and the front bumper 8 include inward extending parts 13a, 13b extending from the end edges toward an inside of the opening 10 disposed inside.

The rear end extending part 11 is, as shown in FIG. 3, a part extending from a rear end edge of the hood edge 6 downward and then extending rearward. In addition, as shown in FIG. 3, the rear end extending part 11 is fixed with a screw to a mounting beam 60 located on a downward side to fix the hood edge 6 to the vehicle V.

Figure 4:
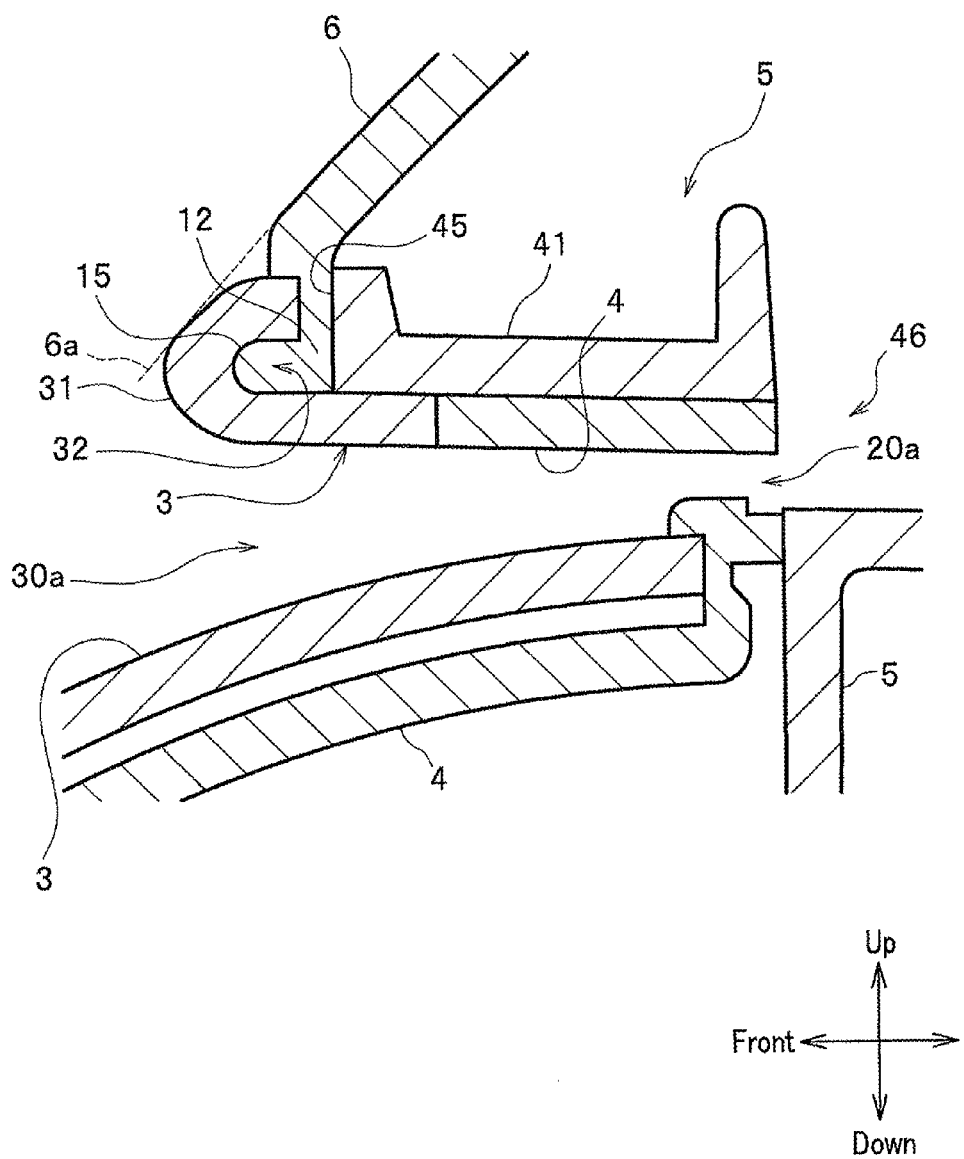
FIG. 4 is an enlarged view of a region surrounded by broke line C in the cross section of the vehicle front end structure shown in FIG. 3.

FIG. 4 is an enlarged view of a region surrounded by a broken line C of the vehicle front structure shown in FIG. 3. The front end edge extending part 12 is, as shown in FIG. 4, a part extending downward from the front end edge of the hood edge 6 and has the claw 15 at a lower end thereof.

The front end edge extending part 12 extends, as shown in FIG. 4, from the front end edge of the hood edge 6 downward and the claw 15 is formed, continuously from the front end edge extending part 12, to have a flat bottom face extending to a front side and a rear side. The front end edge extending part 12 is pinched (nipped) and held between a grille supporting part 31 and the pressurizing part 41 such that the grille supporting part 31 (later described) abuts thereon from a front side of the front end edge extending part 12 and the pressurizing part 41 (later described) of a back plate 5 abuts thereon from a rear side of the front end edge extending part 12.

The claw 15 is, as shown in FIG. 4, a part protruding from the lower end of the front end edge extending part 12 to the front thereof and formed to fit into the fitting part 32 (later described) formed on the front grille 3.

The inward extending part 13a is, as shown in FIG. 2, a part extending from an end edge on an inner side of the connecting part 7 to a back face side and further extends to inside of the opening 10. A back face side of the grille base 4 disposed at the opening 10 is supported by the inward extending part 13a. In addition, the inward extending part 13a has a positioning pin 16 formed to facilitate to position the grille base 4 to be disposed at the opening 10

In addition, the inward extending part 13b is a part extending from an upper end edge of the front bumper 8 downward and has the through hole 17 for fixing the grille base 4 disposed at the opening 10 by fixing with a screw.

Next, will be described the grille base 4, the front grille 3, and the back plate 5.

Figure 5:
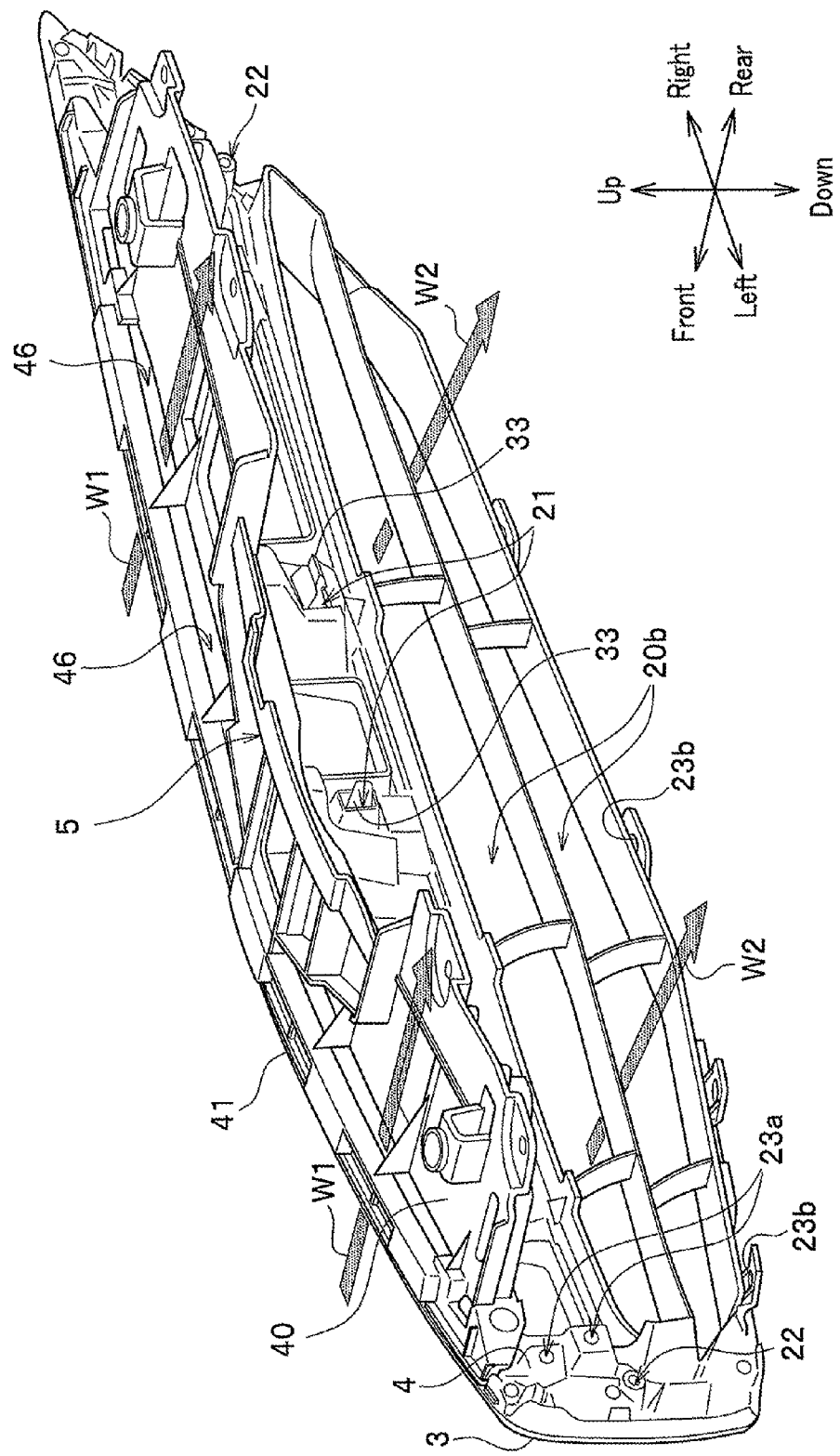
FIG. 5 is a perspective view of a back face of a combination of a front grille, a grille base, and a back plate according to the embodiment when viewed from a right upper side.

FIG. 5 is a perspective view of a back face of a combination of the front grille, the grille base, and the back plate according to the embodiment when viewed from a right upper side.

The grille base 4 is, as shown in FIGS. 3 and 5, a part fixed to the opening 10 and fixes the front grille 3 in front thereof and the back plate 5 rearward.

Accordingly, the grille base 4 includes, as shown in FIG. 5, at a center part thereof the engaging part 21 into which a protruding part 33 (described later) of the front grille 3, a hollow part 22 into which the positioning pin 16 formed at the inward extending part 13a fitted when the grille base 4 is installed at the opening 10, and the through holes 23a, 23b formed at the upper part, a side part, and the lower part (through holes at the upper part are omitted).

Here, the through holes (not shown) formed at the upper part of the grille base 4 on a rear side are holes for fixing the back plate 5 as shown in FIG. 5 and formed between the upper air inlet 20a and the lower air inlet 20b of the grille base 4.

In addition, as shown in FIG. 5, the through hole 23a at the side part is a hole for fixing the front grille 3 disposed in front thereof by fixing a screw. Using the through holes 23a formed at the upper part and the side part, as shown in FIG. 5, the front grille 3 is fixed in front of the grille base 4, and behind the grille base 4, the back plate 5 is fixed.

In addition, the through hole 23b formed at the lower part of the grille base 4 is a hole formed at a location corresponding to the through hole 17 (see FIG. 2) formed in the inward extending part 13b. A screw inserted through the through hole 17 of the inward extending part 13b is fixed at the through hole 23b formed at the lower part. Accordingly, the grille base 4 is fixed to the opening 10.

Moreover, the grille base 4 has the air inlets 20 formed at the upper part and a part from the middle part to the lower part to extend in the left-right direction to allow the ambient air to flow into the vehicle V during traveling in a state that the grille base 4 is, as shown in FIG. 3, fixed to the opening 10. The air inlet on the upper side for taking ambient air W1 is simply referred to as "upper intake inlet 20a", and the air inlet on the lower side for taking ambient air W2 is simply referred to as "lower intake inlet 20b".

The front grille 3 is, as shown in FIG. 1, formed in the same shape as the opening 10 of the front resin member 2 and fixed in front of the grille base 4 fixed to the opening 10.

The front grille 3 fixed to the opening 10 is, as shown in FIG. 3 in a cross-sectional view, formed along the curved plane M defined by the connecting part 7 and forms a vehicle front surface together with the hood edge 6, the connecting part 7, and the front bumper 8 of the front resin member 2.

The front grille 3 is, as shown in FIG. 3, formed to have an upper opening 30a at the upper part and a lower opening 30b from the middle part to the lower part to allow the ambient air to flow into the upper air inlet 20a and the lower air inlet 20b of the grille base 4 disposed at a rear part.

In addition, the front grille 3 is formed to have the protruding part 33 rearward protruding toward a back face side at a middle part and a hole (not shown) at the side part.

The protruding part 33 is a structure for being inserted into and engaged with the engaging part 21 of the grille base 4 and also a structure that a screw inserted through the through hole 23b of the grille base 4 is fixed at a hole (not shown) to fix the front grille 3 in front of the grille base 4.

In addition, as shown in FIG. 4, the front grille 3 is formed to have the grille supporting part 31 extending from the upper end thereof and the fitting part 32 in a concave form.

The grille supporting part 31 is formed in an approximately U-shape in the cross section view such that an upper end edge of the front grille 3 extends, as shown in FIGS. 3 and 4, forward up to the extension line L of a curved face defined by the hood edge 6 when the front grille 3 is fixed to the opening 10 and extends rearward to abut the front end edge extending part 12.

According to the grille supporting part 31, when the front grille 3 is fixed to the opening 10, as shown in FIG. 4, the grille supporting part 31 abuts the front end edge extending part 12 of the hood edge 6 from a front side.

Moreover, as shown in FIG. 4, the grille supporting part 31 abutting the front end edge extending part 12 fills a space between the front end edge extending part 12 and the extension line L of the face of the hood edge 6. Accordingly, the hood edge 6 and the front grille 3 are flush with each other as shown by the broken line 6a.

On the other hand, the fitting part 32 is, as shown in FIG. 4, a groove formed in the grille supporting part 31 having an approximately U-shape on an inner circumferential side of the grille supporting part 31, the claw 15 is fitted into the fitting part 32 by that the front grille 3 is fixed to the opening 10.

The back plate 5 is, as shown in FIG. 5, fixed on a back face side of the grille base 4 and a member in an approximately plate shape for separation between the ambient air W1 flowing through the upper air inlet 20a of the grille base 4 and the ambient air W2 flowing through the lower air inlet 20b.

More specifically, the back plate 5 includes the separating member 40 extending, as shown in FIG. 5, from a back face of the grille base 4 to the rear side and the pressurizing part 41 abutting and pressurizing a back face of the front end edge extending part 12.

Figure 6:
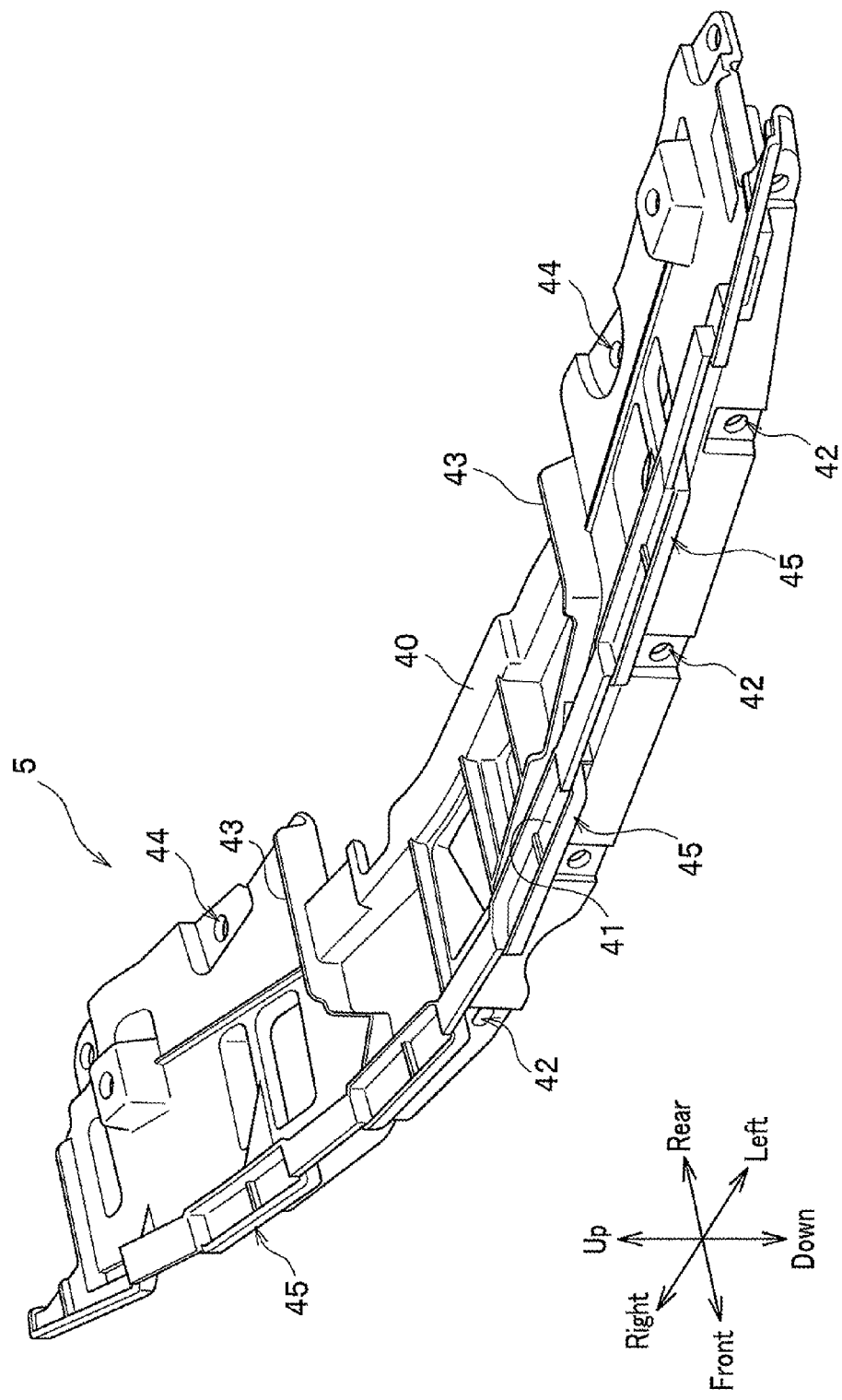
FIG. 6 is a perspective view of the back plate as an embodiment when viewed from a left upper side.

The separating member 40 is, as shown in FIG. 6, a plate member which is long in the left-right direction and the front-rear direction and has a plurality of the through holes 42 going therethrough at locations in a part downwardly extending from the front end edge thereof.

The through hole 42 is a through hole formed at locations corresponding to the through holes (not shown) formed above the grille base 4. The separating member 40 is fixed to a back face of the grille base 4 by that a screw inserted through the through hole 42 is fixed at a through hole (not shown) formed at an upper part of the grille base 4 to fix the separating member 40 to a back face of the grille base 4.

Figure 7:
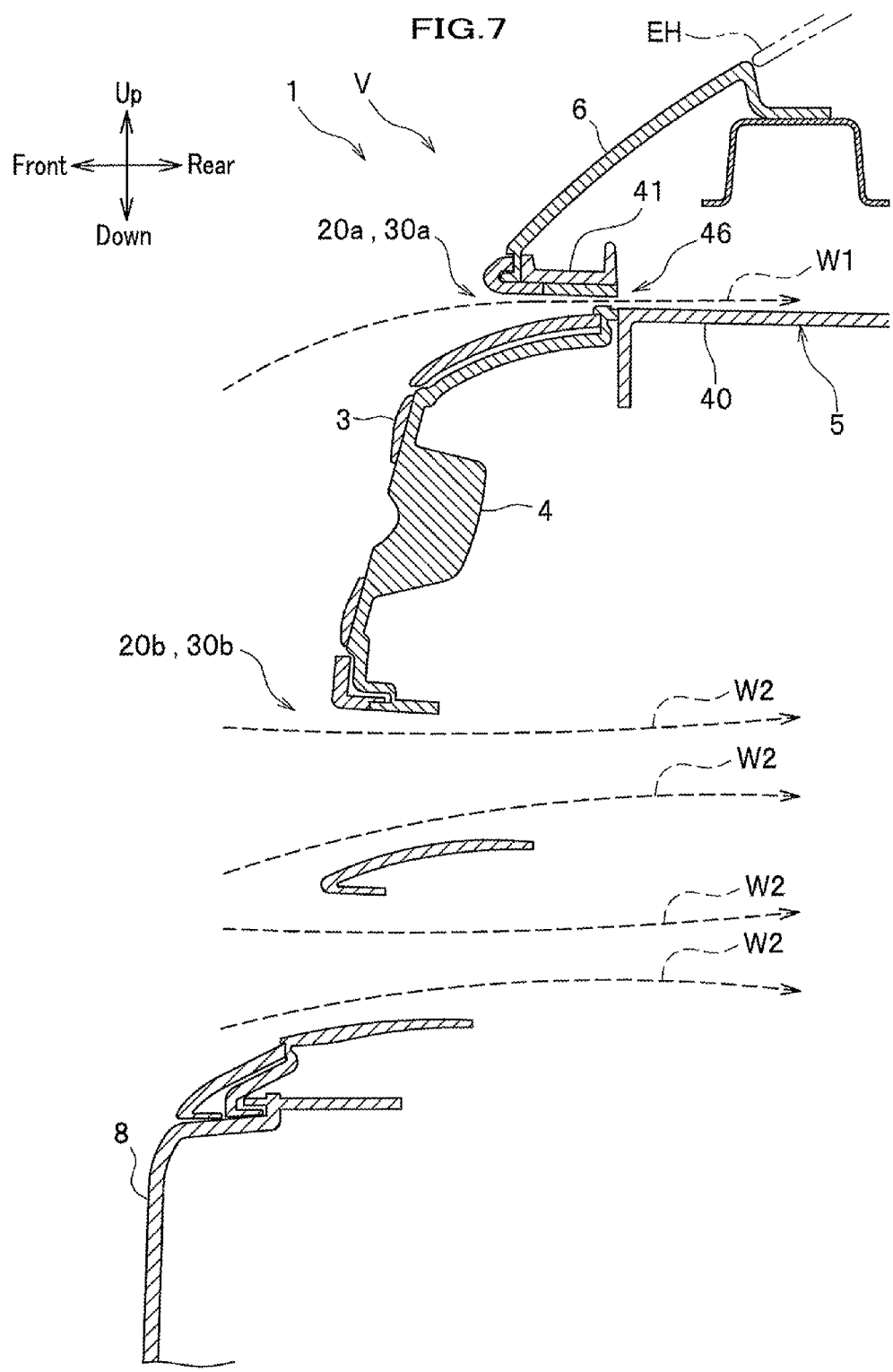
FIG. 7 is a cross section of the vehicle front end structure, taken along line B-B in FIG. 1, when viewed from the vehicle width direction.

Accordingly, in the inside space of the vehicle front part 1, as shown in FIG. 7, the separating member 40 of the back plate 5 extends rearward between the upper air inlet 20a and the lower air inlet 20b on the back face of the grille base 4 for separation in the up-down direction.

The separating member 40 has the ribs 43 on a surface thereof from a point view of stiffness and through holes 44 going through in the up-down direction at a rear part thereof. The through holes 44 are, as shown in FIG. 3, holes for fixation to the mounting beam 60 located above the through holes 44 with screws.

The pressurizing part 41 is a part extending from an upper face of the separating member 40 to a front upper side, so as to abut a back face of the front end edge extending part 12 of the hood edge 6 in fixation of the back plate 5.

A front end face where the pressurizing part 41 abuts the front end edge extending part 12 is, as shown in FIG. 4, the abutting face 45 formed to vertically extend long in the up-down direction to be formed to surely pressurize the front end edge extending part 12.

Under the pressurizing part 41, as shown in FIG. 5, an upper opening 46 is formed. This allows the ambient air to flow through the upper opening 46 of the pressurizing part 41 above the separating member 40 to be outputted rearward.

As the vehicle front structure according to the embodiment has been described above, the hood edge 6 in the embodiment has a shape allowing the metal mold to be slid downward because the front end edge extending part 12 engaged with the front grille 3 extends downward. Accordingly, the hood edge 6 can be formed integral with the front end edge extending part 12.

Mounting between the hood edge 6 having such the front end edge extending part 12 and the front grille 3 is provided by a pinching structure for pinching the front end edge extending part 12 between the front grille 3 and the back plate 5 fixed to the front side and the rear side of the grille base 4.

More specifically, as shown in FIG. 4, with the pinching structure for pinching the front end edge extending part 12 of the hood edge 6 by the grille supporting part 31 of the front grille 3 and the pressurizing part 41 of the back plate 5, the front grille 3 can be mounted under the hood edge 6.

According to the pinching structure shown in the embodiment, the claw 15 formed at the lower end of the front end edge extending part 12 can prevent the front grille 3 fixed to a lower part of the hood edge 6 from dropping because the claw 15 is fitted into the fitting part 32 of the grille supporting part 31 of the front grille 3 to be engaged with the fitting part 32 by the claw 15.

In addition, the claw 15 has a shape capable of being demolded by sliding the metal mold downward because the claw 15 formed at the lower end of the front end edge extending part 12 protrudes forwardly.

According to the hood edge 6 having the front end edge extending part 12 and the pinching structure which have been described in the embodiment, the grille supporting part 31 of the front grille 3 is disposed between the extension line L defined by the plane of the hood edge 6 and the front end edge extending part 12, which fills the space described earlier.

Accordingly, the hood edge 6 is flush with the front grille 3, which meets the design and aerodynamic requirements.

In addition, in the pinching structure according to the embodiment, as a member for pressurizing the rear part of the front end edge extending part 12 of the hood edge 6, the back plate 5 for separating the ambient air W1 and the ambient air W2 flowing through the upper opening 30a and the lower opening 30b of the front grille 3 is used. This eliminates necessity of a special member for pinching the hood edge 6, so that the number of the parts can be reduced.

Moreover, an inside space of the vehicle front part 1 according to the embodiment is, as shown in FIG. 7, partitioned for separation in the up-down direction by the separating member 40 of the back plate 5. Accordingly, the ambient air W1 flowing from the upper air inlet 20a can be supplied to an engine (not shown). On the other hand, the ambient air W2 flowing from the lower air inlet 20b can be supplied to a radiator (not shown). Therefore, according to the pinching structure of the embodiment, there is no necessity to supply the ambient air heated by the radiator to the engine, so that it become possible to enhance an air intake efficiency of the engine.

In addition, in the front resin member 2 according to the embodiment, the hood edge 6, the connecting part 7, and the front bumper 8 are integrally formed. Accordingly, this provides enhancement in a stiffness and decrease in the number of parts, compared with a case where the hood edge 6, the connecting part 7, and the front bumper 8 are respectively resin-molded, as well as the hood edge 6, the connecting part 7, and the front bumper 8 are integral, which provides a smooth continuous surface.

As the vehicle front structure according to the embodiment of the present invention has been described. However, the present invention is not limited to the vehicle front structure according to the embodiment, but may be appropriately modified in accordance with the structure of the vehicle V.

For example, the hood edge 6 according to the embodiment has a short length in front-rear direction. However, the present invention is not limited to this, but the hood edge 6 may be formed to have a gentle curved face or a steep slope surface. In addition, the present invention is applicable to a case where the hood edge 6 is not integral with the connecting part 7 and the front bumper 8.

The invention claimed is:

1. A vehicle front structure comprising:
   a front grille; and
   a hood edge, having a slope surface, disposed above the front grille, configured to receive a front end edge of an engine hood of a vehicle, having a front end edge extending part extending downward in an up-down direction from a front end edge thereof, wherein
   the front grille includes, at an upper end thereof, a grille supporting part, extending between an extending line of the hood edge and the front end edge extending part in a front-rear direction of the vehicle,
   the front end edge extending part is pinched in the front-rear direction of the vehicle between the grille supporting part and a supporting member provided behind the front grille,
   the front end edge extending part further includes a claw, at a lower end thereof, extending forward, wherein the grille supporting part includes a fitting part having, in a cross section thereof, substantially a U-shape which allows the claw to be fitted thereto, the supporting member including an abutting part, extending in a vertical direction, configured to pressurize the front end extending part, and wherein
   the front end edge extending part is pinched to be held between the grille supporting part into which the claw is fitted and the abutting surface of the supporting member.

2. The vehicle front structure as claimed in claim 1, wherein the hood edge protrudes upward to have an upward convex shape.

3. The vehicle front structure as claimed in claim 1, further comprising:
   a front bumper disposed under the front grille;
   a connecting part, extending along the front grille downward from both ends in a width direction of the hood edge, being continuous to the front bumper, wherein the hood edge, the connecting part and the front bumper are integrally formed.

4. The vehicle front structure as claimed in claim 1, wherein the front grille has a plurality of ambient air intake openings for sucking ambient air into inside of the vehicle, wherein the supporting member comprises a separating member for separating a flow passage of the ambient air sucked into the inside of the vehicle into up and low.

5. A vehicle front structure comprising:
   a front grille; and
   a hood edge, having a slope surface, disposed above the front grille, configured to receive a front end edge of an engine hood of a vehicle, having a front end edge extending part extending downward in an up-down direction from a front end edge thereof, wherein
   the front grille includes, at an upper end thereof, a grille supporting part, extending between an extending line of the hood edge and the front end edge extending part in a front-rear direction of the vehicle, and wherein
   the front end edge extending part is pinched between the grille supporting part and a supporting member provided behind the front grille.

6. The vehicle front structure as claimed in claim 5, wherein the hood edge protrudes upward to have an upward convex shape.

7. The vehicle front structure as claimed in claim 5, wherein the front end edge extending part further includes a claw, at a lower end thereof, extending forward, wherein the grille supporting part includes a fitting part having, in a cross section thereof, substantially a U-shape which allows the claw to be fitted thereto, the supporting member including an abutting part, extending in a vertical direction, configured to pressurize the front end extending part, and wherein
   the front end edge extending part is pinched to be held between the grille supporting part into which the claw is fitted and the abutting surface of the supporting member.

8. The vehicle front structure as claimed in claim 5, further comprising:
   a front bumper disposed under the front grille;
   a connecting part, extending along the front grille downward from both ends in a width direction of the hood edge, being continuous to the front bumper, wherein the hood edge, the connecting part and the front bumper are integrally formed.

9. The vehicle front structure as claimed in claim 5, wherein the front grille has a plurality of ambient air intake openings for sucking ambient air into inside of the vehicle, wherein the supporting member comprises a separating member for separating a flow passage of the ambient air sucked into the inside of the vehicle into up and low.

10. A vehicle front structure comprising:
    a front grille; and
    a hood edge, disposed above the front grille, configured to receive a front end edge of an engine hood of a vehicle, having a front end edge extending part extending downward from a front end edge thereof, wherein
    the front grille includes, at an upper end thereof, a grille supporting part, extending between an extending line of the hood edge and the front end edge extending part, the front end edge extending part is pinched in a front-rear direction of the vehicle between the grille supporting part and a supporting member provided behind the front grille, the front end edge extending part further includes a claw, at a lower end thereof, extending forward, wherein the grille supporting part includes a fitting part having, in a cross section thereof, substantially a U-shape which allows the claw to be fitted thereto, the supporting member including an abutting part, extending in a vertical direction, configured to pressurize the front end extending part, and wherein the front end edge extending part is pinched to be held between the grille supporting part into which the claw is fitted and the abutting surface of the supporting member.

11. The vehicle front structure as claimed in claim 10, wherein the hood edge protrudes upward to have an upward convex shape.

12. The vehicle front structure as claimed in claim 10, further comprising:

a front bumper disposed under the front grille;

a connecting part, extending along the front grille downward from both ends in a width direction of the hood edge, being continuous to the front bumper, wherein the hood edge, the connecting part and the front bumper are integrally formed.

13. The vehicle front structure as claimed in claim 10, wherein the front grille has a plurality of ambient air intake openings for sucking ambient air into inside of the vehicle, wherein the supporting member comprises a separating member for separating a flow passage of the ambient air sucked into the inside of the vehicle into up and low.

* * * * *